United States Patent [19]
Meinzer

[11] Patent Number: 6,142,477
[45] Date of Patent: Nov. 7, 2000

[54] ACTIVE SEAL

[75] Inventor: Richard A. Meinzer, Glastonbury, Conn.

[73] Assignee: United Technologies Corporation, Hartford, Conn.

[21] Appl. No.: 09/192,768

[22] Filed: Nov. 16, 1998

[51] Int. Cl.[7] ............................................. F02C 7/12
[52] U.S. Cl. ................... 277/378; 277/410; 277/919
[58] Field of Search ..................... 277/378, 410, 277/919, 416, 543; 415/55.2, 174

[56] References Cited

U.S. PATENT DOCUMENTS

| | | |
|---|---|---|
| 4,386,784 | 6/1983 | Banks . |
| 4,462,264 | 7/1984 | Feller . |
| 4,575,103 | 3/1986 | Pedu ............................................. 277/80 |
| 5,012,420 | 4/1991 | Walker et al. . |
| 5,161,804 | 11/1992 | Orlowski et al. ........................ 277/80 |
| 5,168,857 | 12/1992 | Hickey ..................................... 123/468 |
| 5,174,584 | 12/1992 | Lahrman . |
| 5,263,816 | 11/1993 | Weimer et al. . |
| 5,281,090 | 1/1994 | Starling . |
| 5,545,007 | 8/1996 | Martin . |
| 5,622,438 | 4/1997 | Walsh et al. . |
| 5,736,800 | 4/1998 | Iannello et al. ......................... 310/90.5 |
| 6,029,978 | 2/2000 | Pelstring et al. ........................ 277/410 |

*Primary Examiner*—Anthony Knight
*Assistant Examiner*—Mark Williams

[57] ABSTRACT

A seal assembly includes a seal element having a plurality of movable seal segments and further includes a plurality of actuators, each associated with a respective one of the seal segments. Each of the seal segments has a coil that generates electrical energy in the presence of a varying magnetic field. Each of the actuators receives energy from the associated seal segments and in response thereto produces a force that causes the segment to move toward or away from a surface on an opposing seal member.

A method for fabricating a seal element for a gas turbine engine includes providing a wafer, forming seal segments on the wafer, dividing the wafer into a plurality of seal segments, and arranging at least two of the plurality of seal segments into a seal element.

15 Claims, 9 Drawing Sheets

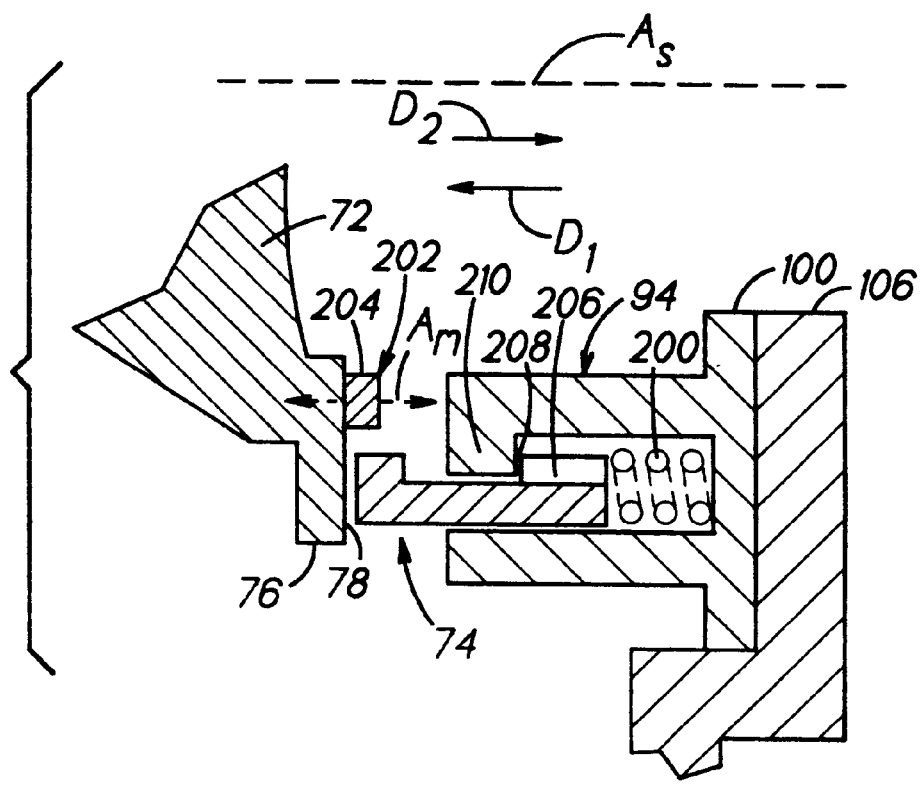

ACTIVE SEAL

TECHNICAL FIELD

This invention relates to an active seal, and more particularly to an active seal made up of a plurality of individual seal segments.

BACKGROUND

Seals are used in many industries. For example, in the art of gas turbine engines, various types of seals are used to limit leakage of gases and fluids. Without these seals, gases and fluids would leak from compartment to compartment. Some of the various types of seals limit leakage through gaps that separate a rotating member and a non-rotating member. One such type of seal is a carbon face seal. Carbon face seals are often used in bearing compartments (e.g., a bearing compartment of a high pressure compressor) to limit leakage of lubricating oil. A carbon face seal includes a non-rotating carbon sealing ring and a rotating mating surface. Springs force the carbon sealing element into contact with the rotating mating surface. The mating surface rotates at the rotational speed of the engine.

Some advanced gas turbine engines subject the carbon face seals to very demanding conditions. For example, a gas turbine engine for a military aircraft often operates at rotational speeds twice as great as that of a gas turbine engine for a commercial aircraft. In addition, military aircraft often undergo maneuvers that introduce significant G forces on the seals. These conditions can cause the carbon sealing ring to wear quickly.

A labyrinth seal is another type of seal used in a gas turbine engine to limit leakage through a gap between a rotating and non-rotating member. A labyrinth seal employs a series of teeth on a rotating member. The teeth are closely spaced to a smooth mating surface on a stationary member. The teeth and the mating surface cooperate to provide a series of constrictions between the rotating and the non-rotating member. The constrictions have the effect of limiting leakage of air from one compartment to another. Leakage has the effect of reducing the efficiency of the engine.

However, because the teeth do not contact the mating surface, a labyrinth seal cannot completely eliminate leakage. Furthermore, the spacing between the teeth and the mating surface must typically be large enough to account for manufacturing tolerances, possible eccentricity of the members and material growth due to temperature and centrifugal loading. Increasing the spacing has the effect of increasing the leakage. The material growth due to temperature typically does not reach an equilibrium until the engine has operated at a steady state condition for 5 to 10 minutes. In addition, in a gas turbine engine for a military aircraft, the spacing must be large enough to account for bending due to aircraft maneuvers that introduce significant G forces.

To put the consequences of leakage through a labyrinth seal into perspective, consider a labyrinth seal used in a turbine rim cavity. Air outside the cavity has a temperature of 3000° F. Purge air having a temperature of 1200° F. is supplied to the cavity in the form of a purge air flow. The purge air flow helps to keep the pressure in the cavity high enough to prevent ingestion of the outside air. The purge air flow to the cavity represents a ½ percent of the air flow of the engine and thereby results in a ½ percent reduction in the efficiency of the engine. The purge air flow and the resulting reduction in the efficiency of the engine could be reduced if the spacing between the teeth and the mating surface could be reduced.

Seals are also used in a gas turbine engine to limit leakage between an engine case and tips of rotating blades. These seals have a plurality of seal segments mounted to the engine case. The seal segments must be properly spaced from the blade tips for the engine to operate optimally. However, the blades expand and contract during engine operation due to varying operating temperatures and rotational speeds. This results in variations in the spacing between the seal segments and the blade tips.

All of the aforementioned seals have a problem, namely that in order to limit leakage, close spacing between a rotating member and a non-rotating member is required, yet contact between the members causes the seal to wear and there are little or no provision to actively control the spacing.

Efforts have been made to actively control the spacing between the seal segments and the rotating blades. U.S. Pat. No. 5,545,007 discloses an active control system that uses piezoelectric actuators to position the seal segments relative to the blade tips. However, the system requires a separate power supply, in order to drive the actuators.

Scientists and engineers working under the direction of Applicant's assignee have been working to provide other seal designs, and methods for fabricating such seal designs, for use in these and other applications.

SUMMARY OF THE INVENTION

An object of one aspect of the present invention is to provide a seal assembly having a seal element that assists in positioning itself in reasonably close proximity to an opposing sealing surface so as to limit leakage. Such a seal element is referred to herein as an active seal element.

An object of another aspect of the invention is to provide a method for fabricating a seal element.

The present invention is predicated in part on the recognition that an active seal element can be constructed from a plurality of individual active seal segments that each generate energy usable in positioning the seal segment.

According to one aspect of the present invention, a seal assembly includes a seal element having a plurality of movable seal segments and further includes a plurality of actuators, each associated with a respective one of the seal segments, each of the seal segments having at least one coil that generates electrical energy in the presence of a varying magnetic field, each of the actuators receiving energy from the associated seal segment and in response thereto produces a force that causes the segment to move toward or away from a surface on an opposing seal member.

According to another aspect of the present invention, a method for fabricating a seal element for a gas turbine engine includes providing a wafer, forming seal segments on the wafer, dividing the wafer into a plurality of seal segments; and arranging at least two of the plurality of seal segments.

One aspect of the present invention provides a seal assembly having an active seal element that assists in positioning itself in reasonably close proximity to a mating sealing surface so as to limit leakage. The active seal element has a plurality of individual seal segments that each generate energy usable in positioning the seal segment. The use of individual seal segments facilitates manufacture of the active seal element. In one detailed embodiment, an active seal element is used in a seal assembly for a bearing compartment. The active seal element positions itself in close proximity to a seal plate, yet does not make continuous contact with the seal plate when the seal plate is rotating.

Thus, the seal element experiences less wear than that experienced by a carbon sealing ring of a carbon face seal and thereby provides a longer operating life than the carbon face seal.

Another aspect of the present invention provides a method for fabricating a seal element. In one detailed embodiment, the seal segments are manufactured using techniques developed for manufacture of micro electro-mechanical systems (MEMS).

These and other objects, features and advantages of the present invention will become more apparent in the light of the following detailed description, accompanying drawings, and claims.

BRIEF DESCRIPTION OF THE DRAWINGS

FIG. 15 is an enlarged view of a portion of FIG. 14.

BEST MODE FOR CARRYING OUT THE INVENTION

Figure 1:
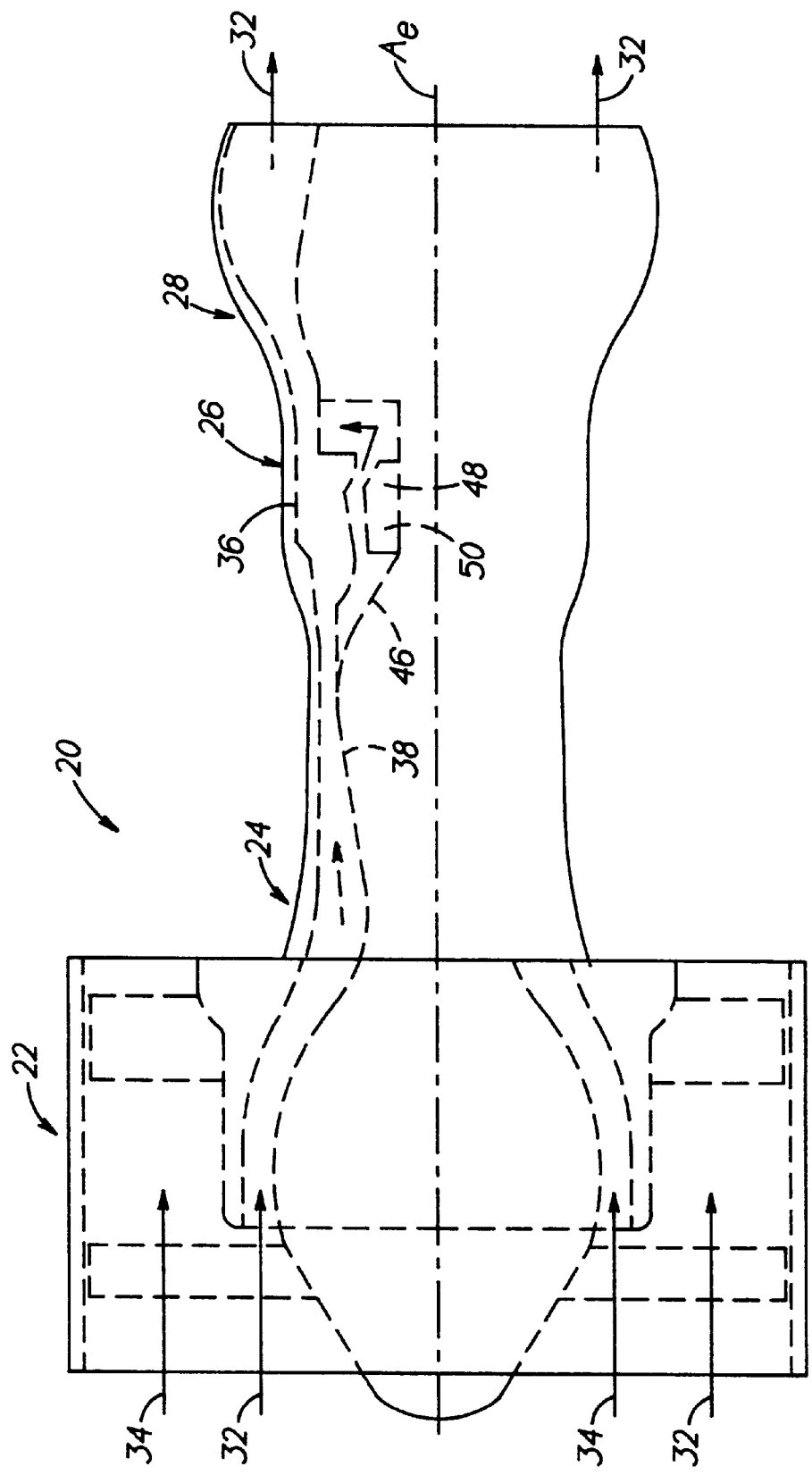
FIG. 1 is schematic representation of a gas turbine aircraft engine, partially sectioned to expose a representation of a wall defining a bearing compartment.

The present invention is disclosed herein with respect to an embodiment for use in a seal assembly in a bearing compartment of a gas turbine engine 20 represented in FIG. 1.

FIG. 1 is a side elevation view of a turbofan gas turbine engine for powering an aircraft. The engine 20 has a longitudinal axis $A_e$. The engine 20 includes a fan section 22, a compressor section 24, a combustor section 26, and a turbine section 28. An annular flow path 32 for primary working medium gases extends through these sections of the engine 20. A flow path 34 for secondary working medium gases is radially outward of the flow path 32 for primary working medium gases. The flow path 34 for secondary working medium gases extends through the fan section 22 of the engine 20.

The engine 20 has a stator assembly 36 and a rotor assembly 38. The stator assembly 36 extends longitudinally through the engine 20. The rotor assembly 38 includes stages in the compressor section 24 and in the turbine section 28. The rotor assembly 38 further includes a rotor shaft 46 that interconnects the stages in the compressor section 24 to the stages in the turbine section 28.

Figure 2:
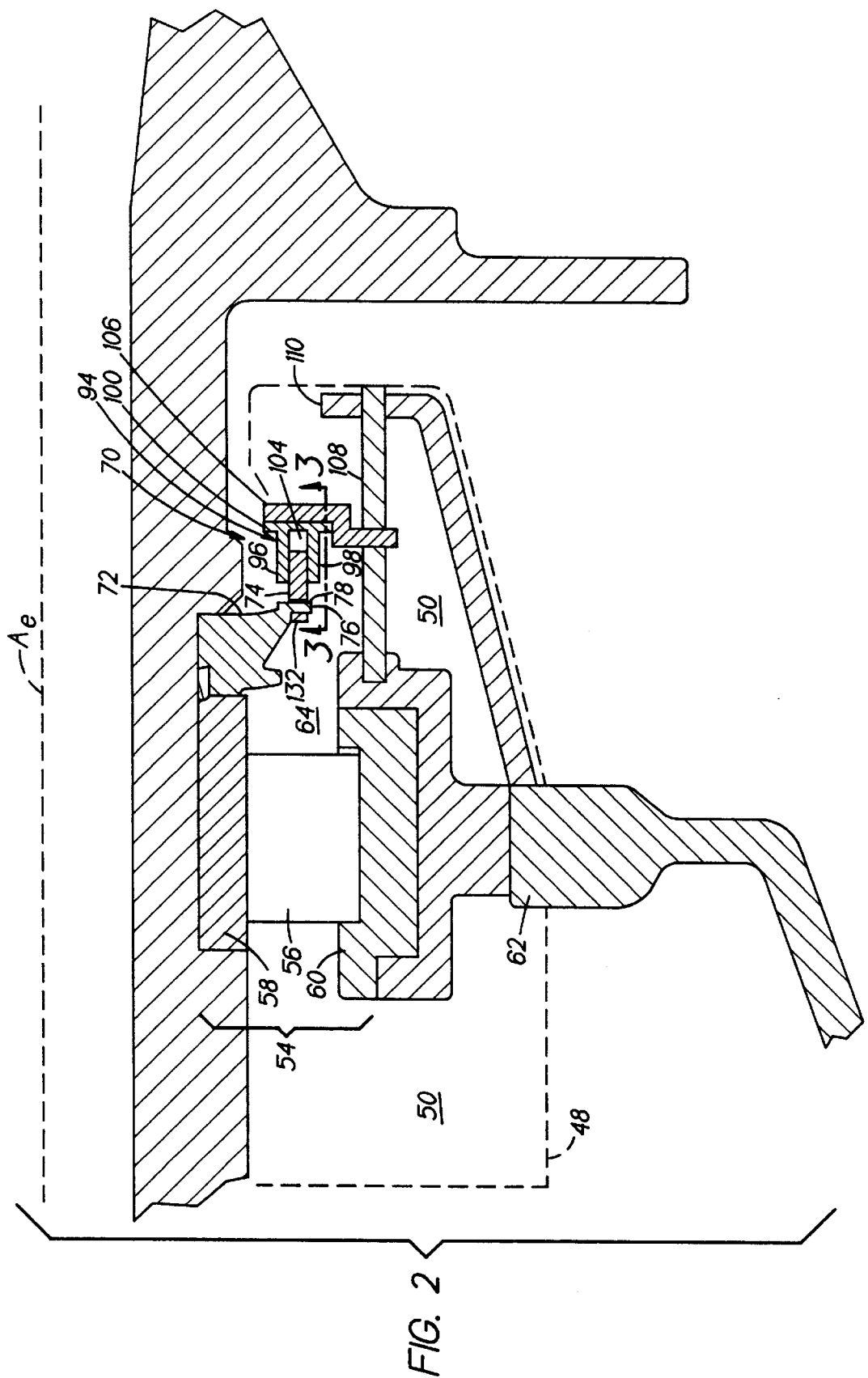
FIG. 2 is a cross section view of the bearing compartment defined in FIG. 1, having a seal assembly with a seal element according to the present invention.

A wall 48 circumscribes the rotor shaft 46 and defines a bearing compartment 50. FIG. 2 is a cross sectional side view of the bearing compartment 50. Referring now to FIG. 2, the bearing compartment 50 houses a bearing assembly 54. The bearing assembly 54 includes an array of roller bearings represented by a roller bearing 56. The roller bearings 56 are disposed between an inner race 58 and an outer race 60. The inner race 58 secures to the rotor shaft 46. The outer race 60 secures to a support member 62 that extends from the stator assembly 36 (FIG. 1) into the bearing compartment 50. The support member 62 provides support for the bearing assembly 54 and the rotor shaft 46. The bearing compartment 50 further includes an oil compartment 64 that houses lubricating oil for the bearing assembly 54. In this embodiment, the temperature in the bearing compartment 50 is about 1200 degrees Fahrenheit (° F.).

Figure 3:
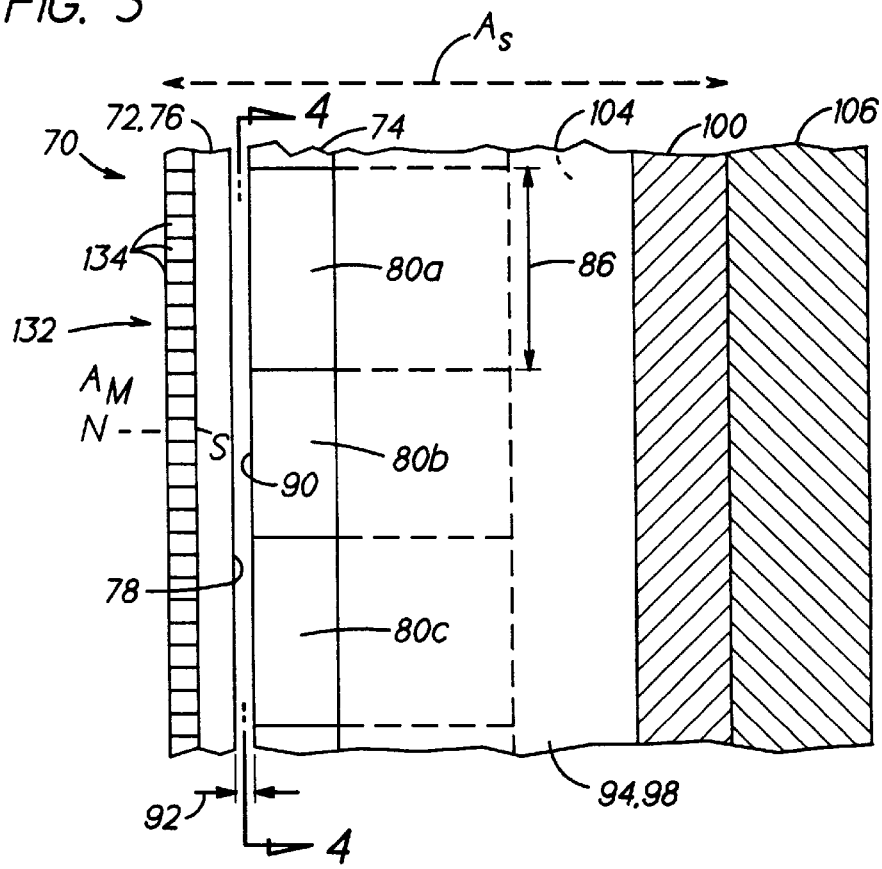
FIG. 3 is an enlarged fragmentary side view, in the direction 3—3 of FIG. 2.

The bearing compartment 50 further houses a seal assembly 70 having an active seal element according to the present invention. FIG. 3 is an enlarged fragmentary side view, in the direction 3—3 of FIG. 2, of the seal assembly 70. Referring now to FIGS. 2, 3, the seal assembly 70 has a longitudinal reference axis $A_s$. The longitudinal reference axis $A_s$ is coincident with the longitudinal axis $A_e$ of the engine 20. The seal assembly 70 includes a seal plate 72 and an active seal element 74. The seal plate 72 is affixed to the rotor shaft 46 and has a flange member 76 with a sealing surface 78. The active seal element 74 has an annular shape and includes a plurality of circumferentially adjacent seal segments, represented by a first seal segment 80a, a second seal segment 80b, and a third seal segment 80c, collectively referred to as seal segments 80. Each of the seal segments 80 is an integral component. As used herein, integral means that it is one piece or acts as one piece. The active seal element 74 has a diameter in a range of 23 centimeters (cm) to 35.6 (cm). Each of the sealing segments 80 has a dimension 86 of about 5 millimeters (mm) along the circumference of the active seal element 74. The seal segments 80 have a dimension 88 (FIG. 4) of about 1 mm in a radial direction 90 (FIG. 4).

Each of the seal segments 80 has a sealing surface 90 facing (i.e., opposing) the sealing surface 78 of the seal plate 72. The sealing surface 90 of the seal segments 80 and the sealing surface 78 of the seal plate 72 are separated by a gap 92. The gap 92 is small enough to have the effect of limiting leakage of oil out of the oil compartment 64. As described hereinbelow, one of the novel aspects of the present invention is that each seal segments 80 assists in positioning itself in reasonably close proximity to the opposing sealing surface 78 so as to limit leakage, and thereby defines the gap 92.

The seal segments 80 are supported in a radial direction by a seal carrier 94 but free to move in directions parallel to the longitudinal axis $A_e$. The seal carrier 94 has an inner ring 96, an outer ring 98, and a base 100. The inner ring 96 and the outer ring 98 are concentric and spaced apart to define a channel 102 (FIG. 4). The channel 102 receives the sealing segments of the active seal element 74. The concentric rings 94, 96 comprise elastic materials and the channel 102 (FIG. 4) is slightly undersized compared to the seal segments 80. This results in a radially directed compressive force on the seal segments 80, thereby increasing support for the seal segments 80. A clearance 104 is provided between the sealing segments and the base 100 of the seal carrier 94. The base 100 of the seal carrier 94 is supported by a stepped retaining ring 106, which in turn is supported by a series of circumferentially spaced pins, represented by a pin 108, and a support shell 110. The pins 108 and the support shell 110 are supported by the support member 62.

Figure 4:
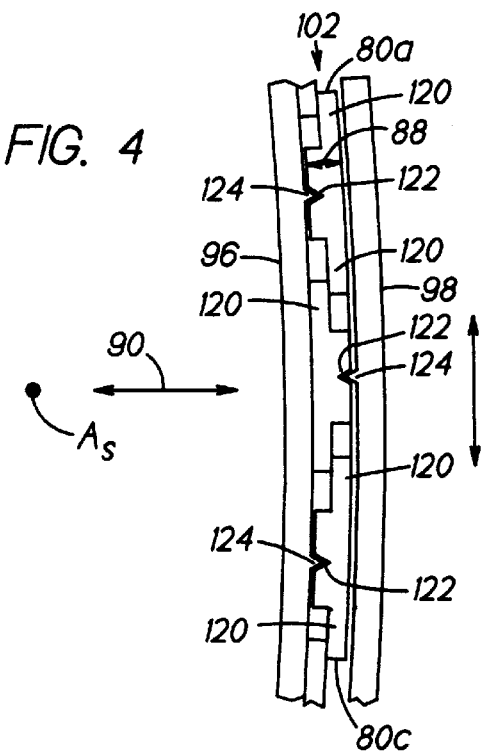
FIG. 4 is a view, in the direction of 4—4 of FIG. 3, of the seal segments and the seal carrier of the seal assembly of FIG. 2.

FIG. 4 is a view, in the direction of 4—4 of FIG. 3, of the seal segments 80 and the seal carrier 94 of the seal of FIGS. 2, 3. Referring now to FIG. 4, in one embodiment, the seal segments 80 are substantially identical to one another. Substantially identical means identical except for differences introduced by manufacturing variations. Making the seal segments 80 substantially identical helps to reduces the cost and the complexity of the active seal element 74. Each seal segment 80 has a pair of extensions 120. The extensions 120 are tapered and flat. Each of the seal segments 80 further includes at least one track 122. The tracks 122 extend in a direction parallel to the longitudinal axis $A_e$.

The inner ring 96 and the outer ring 98 each further include a plurality of locators 124. The locators 124 extend in a direction parallel to the longitudinal axis $A_e$. Each of the locators 124 cooperates with a respective track 122 of a seal segment 80 to restrict the seal segment 80 from moving circumferentially within the carrier 94.

Every second one of the seal segments 80 is oriented to have its extensions 120 adjacent to the outer ring 98 of the carrier 94. The other seal segments 80 are oriented to have their extensions 120 adjacent to the inner ring 96 of the carrier 94. Such an orientation is referred to herein as an alternately inverted orientation. With this orientation, each seal segment 80 circumferentially overlaps the adjacent seal segments 80. The overlap helps to limit leakage that might otherwise occur between the seal segments 80.

Figure 6:
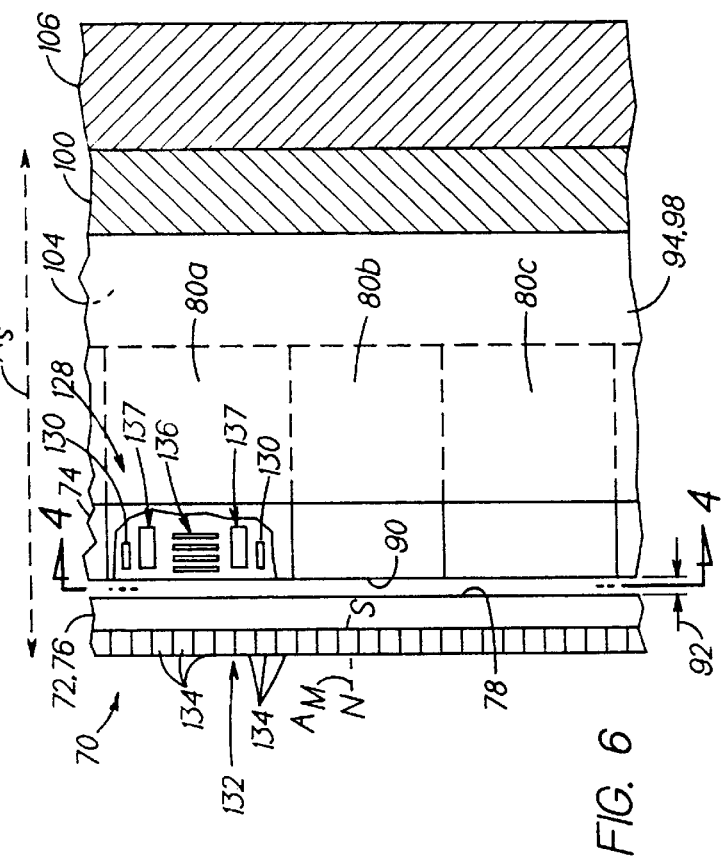
FIG. 6 is a view similar to that of FIG. 3, having a portion of one of the seal segments broken away and a representation of a layout of a plurality of components on the seal segment of FIG. 3.

Referring now to FIG. 6, in a view similar to that of FIG. 3, a portion of one of the seal segments 80a is broken away and has a representation of a layout of a plurality of components 128 on the seal segment 80. Each of the plurality of components 128 are integral to the seal segment, e.g., embedded within or affixed to the seal segment. The components are described hereinbelow.

The seal assembly 70 includes a biasing assembly. The biasing assembly includes at least one magnetic member 130 on each of the seal segments 80. The term magnetic member refers to member comprising a material attracted to a magnetic field. In this embodiment, the magnetic member 130 comprises a pair of metal plates.

The biasing assembly further includes an annular magnet 132 affixed to the flange member 76 of the seal plate 72. The annular magnet 132 has a plurality of circumferentially spaced magnet segments, represented by magnet segments 134. Each of the magnet segments 134 is a permanent magnet. Note that permanent magnets typically retain their magnetism up to a temperature in excess of 1600° F., commonly referred to as the Curie temperature. Each magnet segment has a magnetic axis with a magnetic north pole and a magnetic south pole, represented by a magnetic axis $A_m$. All of the magnetic axes are parallel to the longitudinal axis $A_e$. Like magnetic poles face in like directions.

The annular magnet 132 produces a magnetic field that results in a magnetic force on the magnetic member 130 of each seal segment. The magnetic force is in a direction $D_1$ that results in the seal segments 80 being biased (e.g., pulled) toward the seal plate 72. The magnetic force has a magnitude that is inversely proportional to the distance between the annular magnet 132 and the magnetic member 130.

The seal assembly 70 further includes an electromagnet 136 on each of the seal segments, which with the annular magnet 132 defines an actuator. The electromagnet 136 has a coil disposed around a core. The coil has a plurality of windings The core comprises a magnetic material, e.g., iron.

Figure 5:
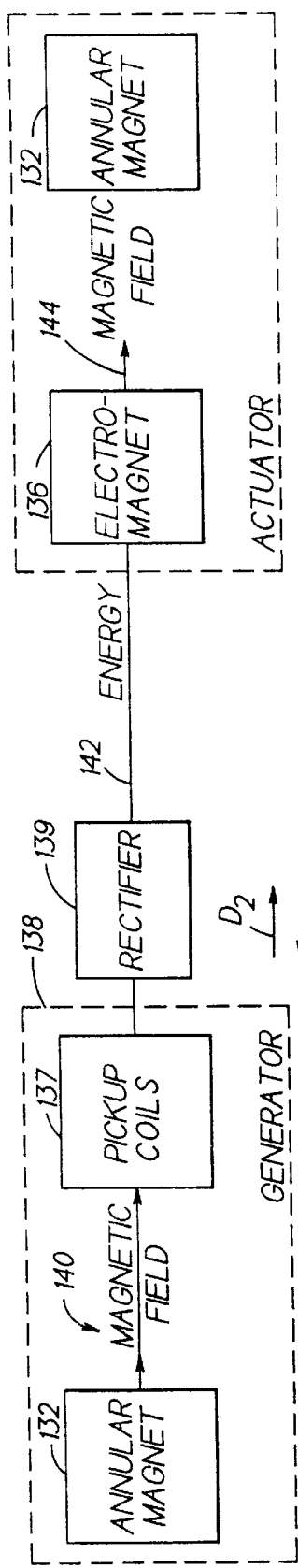
FIG. 5 is a schematic representation of an electrical circuit used in a seal segment of FIG. 3.

Each of the seal segments further includes at least one pickup coil, represented by a pair of pickup coils 137, which with the annular magnet 132 defines a generator 138. Each pickup coil has one or more windings. Referring also now to FIG. 5, the generator 138 is in communication with the actuator, in particular, the electromagnet 136 of the actuator. A rectifier 139 may be employed between the generator and the actuator. The rectifier 139 comprises one or more diodes, for example, silicon carbide diodes that are suitable for use in high temperature environments.

The seal assembly 70 operates as follows. If the engine 20 is operating then the rotor shaft 46 rotates about the longitudinal reference axis $A_e$ of the engine 20. The rotation of the rotor shaft 46 causes the seal plate 72 and the annular magnet 132 to rotate about the longitudinal axis $A_e$. Because the annular magnet 132 comprises spaced magnet segments 134, rotation of the annular magnet 132 results in a varying magnetic field 140 (FIG. 5).

The pickup coils 137 of the generator 138 are responsive to magnetic energy from the varying magnetic field 140. The pickup coils 137 convert the magnetic energy to electrical energy in the form of a varying electrical voltage. The voltage from the pickup coils 137 is input to the rectifier 139 to produce a steady (i.e., dc) voltage. The electromagnet 136 receives the dc voltage via a conductor 142 (FIG. 5), resulting in an electrical current through the electromagnet 136. The electrical current causes the electromagnet 136 to produce a magnetic field 144 (FIG. 5). The magnetic field has a magnitude proportional to the magnitude of the current. The magnetic field 144 interacts with the annular magnet 132 and thereby results in a magnetic force. The magnetic force is in a direction $D_2$ that pushes the seal segment away from the annular magnet 132 and the seal plate 72. This direction is opposite to the direction $D_1$ of the force resulting from the biasing assembly (i.e., the magnetic member 130 and the annular magnet 132). The magnetic force has a magnitude that depends on the magnitude of the dc current through the electromagnet 136 and the distance between the electromagnet 136 and the annular magnet 132.

The opposing forces cause the seal segment 80 to move to a position of equilibrium. As used herein, the position of equilibrium means the position at which the magnitude of one of the opposing forces is equal to the magnitude of the other of the opposing forces. At the equilibrium position, the sealing surface 90 of the seal segment 80 is positioned proximate to the sealing surface 78 of the seal plate 72. The seal segment 80 may make intermittently contact to the seal plate 72 in response to transient conditions within the engine 20. However, the seal segment typically does not make continuous contact with the seal plate 72 while the seal plate 72 is rotating. The equilibrium position effectively determines the gap 92. As stated above, the gap 92 is small enough to have the effect of limiting leakage of oil out of the oil compartment 64.

If the engine 20 is not operating then the rotor shaft 46 is not rotating. Accordingly, the seal plate 72 and the annular magnet 132 do not rotate. The annular magnet 132 does not produce a varying magnetic field. Consequently, the pickup coils 137 of the generator 138 do not produce electric energy to power the electromagnet 136. Thus, there is no substantial force to oppose the force provided by the biasing assembly (i.e., the magnetic member 130 and the annular magnet 132). The force in the direction $D_1$ provided by the biasing assembly causes the seal segments 80 to move toward and abut the seal plate 72, thereby establishing a face seal that limits leakage of oil out of the oil compartment 64. Because the seal plate 72 is riot rotating, the abutment does not cause excessive wear to the sealing surface 90 of the seal segment 80.

In this embodiment, the operation of the seal assembly 70 has a fail safe aspect. In the event of a failure that prevents an electromagnet 136 in a seal segment 80 from producing a magnetic field, the force in the direction $D_1$ from the biasing assembly (i.e., the magnetic member 130 and the annular magnet 132) causes the seal segment 80 to move toward and abut the seal plate 72. The sealing surface 90 of the seal segment 80 will wear, leading to a degradation comparable to that observed with carbon face seals. However, the abutment establishes a face seal that limits leakage of oil out of the oil compartment 64. Note that it may be desirable to create and transmit a signal (not shown) indicating that the failure has occurred.

The annular magnet 132, the magnetic member 130, the pickup coils 137, and the electromagnet 136 are chosen so as to result in an equilibrium position that provides a desired gap 92. The actuator typically receives a predetermined portion of the energy generated by the generator 138. The predetermined portion may be all or less than all of the energy generated by the generator 138.

The present invention provides an active seal element 74 that assists in positioning itself in reasonably close proximity to a mating sealing surface 78 so as to limit leakage. Yet the seal element 74 typically does not make continuous contact with the seal plate 72 when the seal plate 72 is rotating. Thus, the seal element 74 experiences less wear than that experienced by a carbon sealing ring of a carbon face seal and thereby provides a longer operating life than a carbon face seal.

Figure 7:
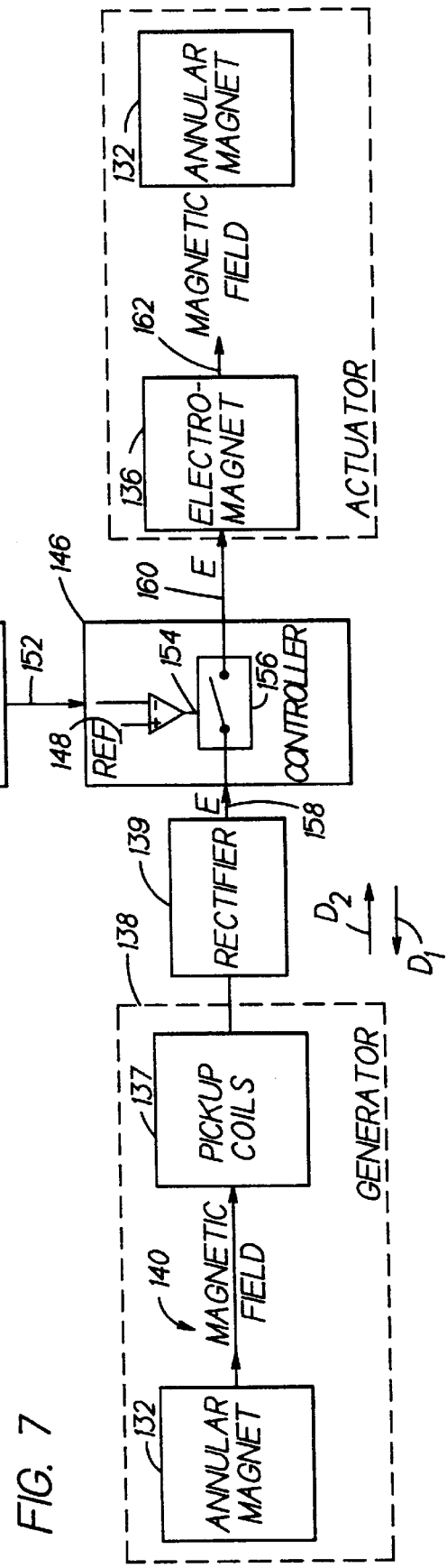
FIG. 7 is a schematic representation of an electrical circuit used in an alternate embodiment of the seal segment of FIG. 3.
Figure 8:
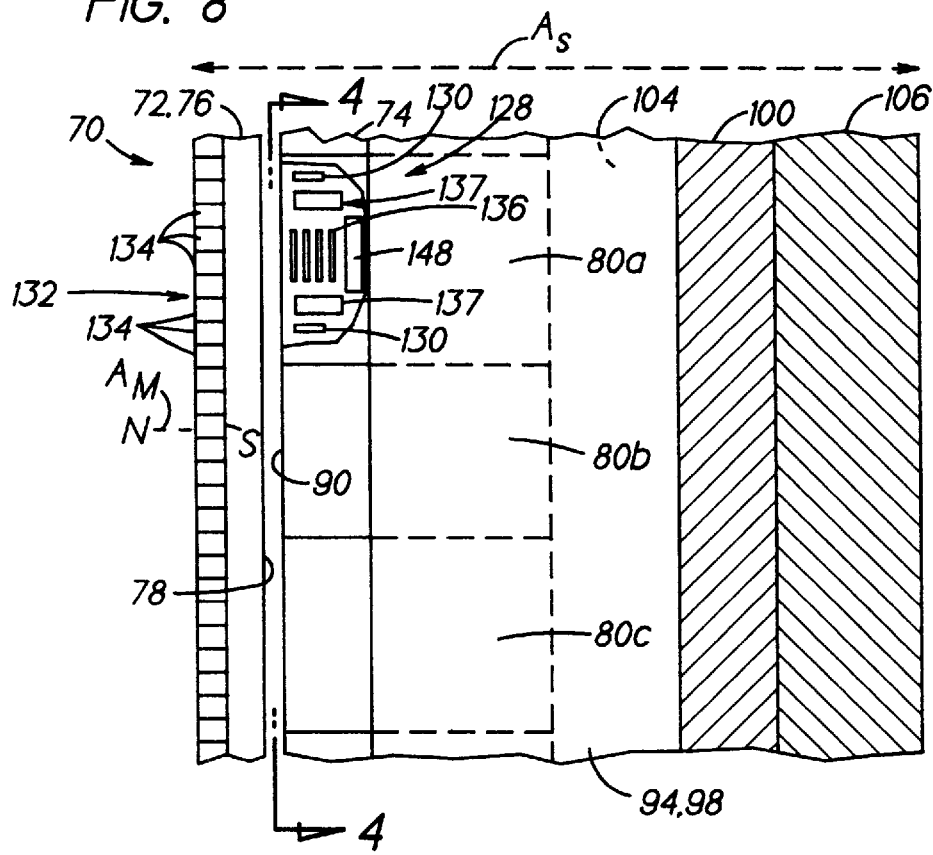
FIG. 8 is a view similar to that of FIG. 3, having a portion of one of the seal segments broken away and a representation of a layout of a plurality of components on the alternate embodiment of the seal segment of FIG. 3.

In an alternative embodiment, the temperature in the bearing compartment 50 has a lower temperature environment, e.g. about 350° F., rather than 1200° F. Referring now to FIGS. 7, 8 in this environment, the seal segment 80 may further include a controller 146. The controller 146 is in communication with and functionally between the generator 138 and the actuator (i.e., the annular magnet 132 and the electromagnet 136). The controller has an electrical reference signal on signal line 148 indicative of a desired gap 92. The seal segment further comprises a proximity sensor 150. In this embodiment, the proximity sensor is a capacitive type of proximity sensor and comprises the metal plates of the magnetic member 130 and the seal plate 72.

The seal assembly 70 operates as follows. If the engine 20 is not operating, the seal assembly 70 operates in the manner described above with respect to the seal assembly 70 of the previous embodiment.

If the engine 20 is operating, the generator 138 produces electrical energy in the manner described above with respect to the seal assembly 70 of the previous embodiment. Thereupon, the controller 146 receives electrical energy from the generator 138. The controller 146 further receives a proximity signal on signal line 152 from the proximity sensor 150. The proximity signal on line 152 is an electrical signal indicative of a measure of the gap 92. The proximity signal on line 152 and the reference signal on line 148 are presented to a difference amplifier 154, which generates a difference signal on line 152 indicative of the difference therebetween. The controller 146 uses the difference signal to control an on/off power switch 156. The on/off power switch 156 is electrically connected to the generator 138, via signal line 158, and electrically connected to the electromagnet 136 via signal line 160. The difference signal drives the switch 156 to a closed state if the measure of the gap is lesser than the desired gap. In the closed state, the switch 156 receives electric energy from the generator 138 and provides electric energy to the electromagnet 136. The electric energy causes the electromagnet 136 to produce a magnetic field 162. The magnetic field results in a magnetic force having a direction $D_2$ that causes the seal segments to move in a direction away from the seal plate 72. This direction $D_2$ is opposite to the direction $D_1$ of the force resulting from the biasing assembly (i.e., the magnetic member 130 and the annular magnet 132). In this embodiment, the active seal element 74 has a response time having a magnitude on the order of milliseconds. If the measure of the gap is greater than or equal to the desired gap, the difference signal drives the switch 156 to an open state. In the open state, electromagnet 136 does not receive electric energy and does not produce a magnetic field. The amount of electric energy provided to the electromagnet 136 depends on how much force is needed to maintain the seal segment at around the desired distance gap from the seal plate 72.

With the operation above, the seal segment controls the gap 92. In practice, the operation of the controller 146 described above may result in some fluctuation in the size of the gap 92. In an alternative embodiment, the controller 146 uses a pulse width modulated signal to drive the on/off power switch. In another alternative embodiment, the on/off power switch 15 may be replaced by a linear type of electronic device to improve control (i.e., reduce fluctuation) of the size of the gap 92. In these alternative embodiments, there is less fluctuation in the size of the gap 92 thereby helping the seal segments to maintain a position of equilibrium that results in the desired gap.

As described above with respect to the seal assembly 70 of the previous embodiment, at the equilibrium position, the sealing surface 90 of the seal segment 80 is positioned proximate to the sealing surface 78 of the seal plate 72. The equilibrium position effectively determines the gap 92. The gap 92 is small enough to have the effect of limiting leakage of oil out of the oil compartment 64. The seal segment 80 may make intermittently contact to the seal plate 72 in response to transient conditions within the engine 20. However, the seal segment typically does not make continuous contact with the seal plate 72 while the seal plate 72 is rotating. Thus, the seal element 74 experiences less wear than that experienced by a carbon sealing ring of a carbon face seal and thereby provides a longer operating life than the carbon face seal.

Because there is a controller 146 in this embodiment, the annular magnet 132, the magnetic member 130, the generator 138, and the electromagnet 136 may have electrical parameter magnitudes that different from those of the annular magnet 132, the magnetic member 130, the generator 138, and the electromagnet 136, respectively, in the previous embodiment.

The electronics in the seal segments are of a type that can operate at temperatures in excess of 400° F. One such type of electronics is disclosed in a reference P. E. Sims, E. Chalfin and B. H. Allison: High-Temperature Embedded Optical Transducer for Real Time Combustion Control, Third International High Temperature Electronics Conference, Albuquerque, N. Mex. Jun. 9–12, 1996. The reference discloses an amplifier fabricated using silicon on insulator technology having a bandwidth of 50 kilohertz at temperatures above 400° F. If the electronics are fabricated using silicon carbide technology, even higher operating temperatures are possible.

Because the active seal element 74 in this embodiment has a controller, it positions itself more accurately and in less time (i.e., faster response time) than that of the active seal element 74 (FIGS. 5,6) of the previous embodiment. By positioning itself more accurately, the seal element 74 of this embodiment can provide a smaller gap 92 and thus further limit leakage compared to the seal element of the previous embodiment. In addition, by having a faster response time, the seal element of this embodiment can further limit leakage and further prevents contact with the seal plate 72 during transient conditions. Thus, the seal element of this embodiment experiences less wear than that experienced by the seal element of the previous embodiment and thereby provides a longer operating life than the seal element of the previous embodiment.

Figure 9:
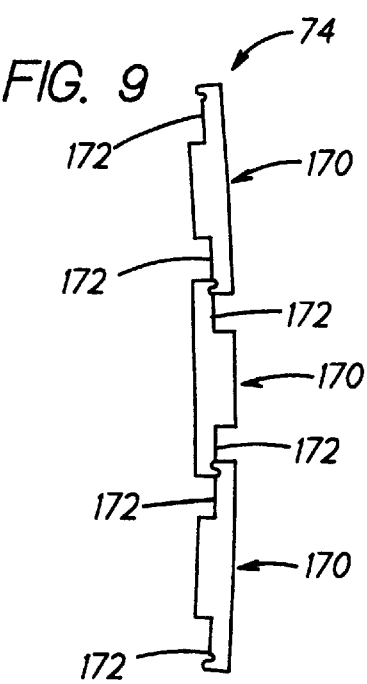
FIG. 9 is a view similar to that of FIG. 4 of an alternate embodiment of the seal segments.

FIG. 9 is a view, in the direction of 4–4 of FIG. 3, of an alternative embodiment of the active seal element 74. Referring now to FIG. 9, the alternative embodiment of the active seal element 74 comprises a plurality of circumferentially adjacent sealing segments, represented by sealing segments 170. The sealing segments 170 are substantially identical. Each of the sealing segments have extensions 172 with S shaped surfaces. With this shape, there is a greater area of contact between the sealing segments 170 than there is between the adjacent sealing segments 80 having extensions 120 (FIG. 4) with flat surfaces. Consequently, the amount of leakage that occurs between adjacent sealing segment is less than the amount of leakage that occurs between adjacent sealing segments 80 having extensions 120 (FIG. 4) with flat surfaces.

Figure 10:
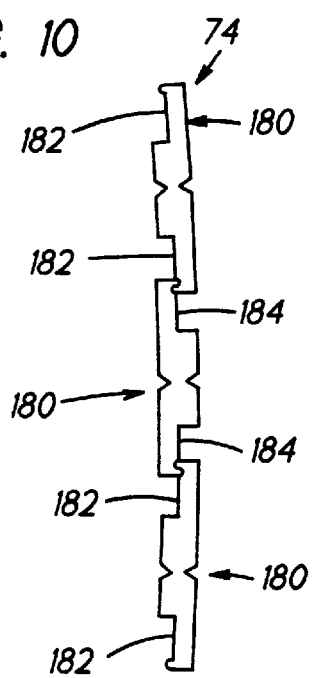
FIG. 10 is a view similar to that of FIG. 4 of an alternate embodiment of the seal segments.

FIG. 10 is a view, in the direction of 4—4 of FIG. 3, of an alternative embodiment of the active seal element. Referring now to FIG. 10, the alternative embodiment of the active seal element 74 comprises a plurality of circumferentially adjacent sealing segments, represented by sealing segments 180. Adjacent sealing segments have shapes different from one another. Every second sealing segment has extensions 182 with raised lips. Each of the other sealing segments has extensions 184 with recesses adapted to receive the raised lips of the adjacent sealing segments. With this shape, there is a greater area of contact between the sealing segments 180 than there is between the adjacent sealing segments 80 having extensions 120 (FIG. 4) with flat surfaces. Consequently, the amount of leakage that occurs between adjacent sealing segments is less than the amount of leakage that occurs between adjacent sealing segments 80 (FIG. 4) having flat surfaces.

The above embodiments can be combined with each other. For example, in one embodiment (not shown), every second sealing segment has extensions with raised lips such as the extensions 182 of the sealing segments 180 (FIG. 10). Each of the other sealing segments has extensions with flat surfaces such as the extensions 120 of the seal segments 80 (FIG. 4).

Figure 11:
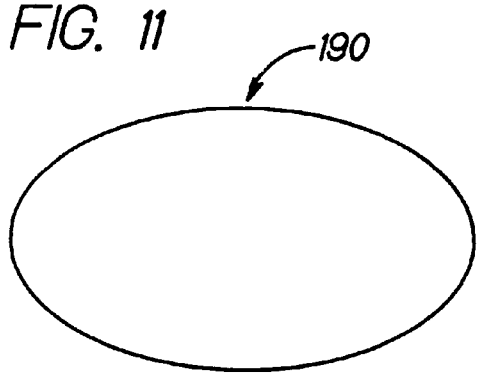
FIG. 11 is a representation of a wafer and a photolithography mask used in the fabrication of the seal segments.
Figure 12:
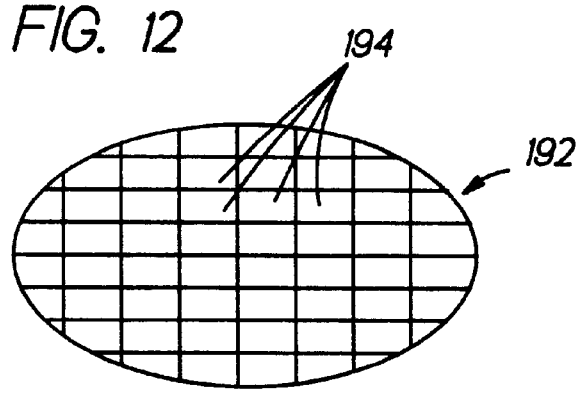
FIG. 12 is a representation of the wafer of FIG. 12 with a plurality of seal segments formed on it.

Referring now to FIG. 11, in one embodiment, the seal segments are manufactured using techniques developed for manufacture of micro electro-mechanical systems (MEMS). Many of such techniques are similar to those developed for manufacture of integrated circuits. Seal segments manufactured in accordance with MEMS fabrication techniques are referred to as MEMS seal segments. MEMS are sometimes alternatively referred to as a microstructure, microsystem or micromachine. A MEMS can incorporate features of various types including but not limited to mechanical, electrical, chemical and optical MEMS. MEMS seal segments are fabricated as a batch on a wafer 190 that may comprise a ceramic material, a semiconductor material (e.g., silicon), or a high temperature plastic material. Referring now to FIG. 12, a series of processing steps are performed on the wafer 190 (FIG. 11) to produce a wafer 192 having a plurality of seal segments, represented by seal segments 194. The number of seal segments depends on the size of the seal segments and the size of the wafer, but is typically in the hundreds or thousands. The processing steps typically include steps to form the seal segments simultaneously, for example, deposition, masking, and etching steps. Bulk processing steps, for example, chemical etching steps and/or lithography electro forming molding (LIGA), are used to remove portions of the substrate and shape the seal segments. A masking step may employ a photolithography mask 196. The generator 138, the electromagnet 136, and the magnetic member 130 each comprise one or more conductive traces or strips, such as those used in integrated circuits, lying in one or more layers (i.e., planes). Photolithography combined with chemical vapor deposition, for example, can be used to deposit metal for the traces. The processing steps may include steps such as and/or similar to those used in manufacture of integrated circuits for example complementary metal oxide semiconductor (CMOS) fabrication. The processing steps may also include techniques such as microelectric discharge machining, wire electro-discharge grinding, and laser assisted etching.

Figure 13:
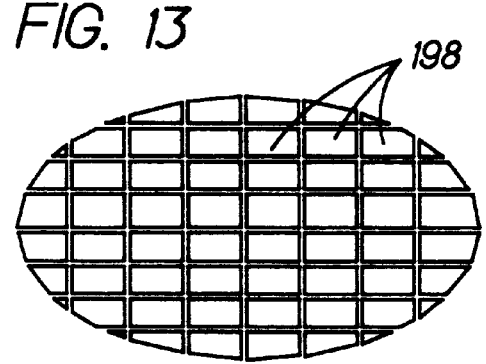
FIG. 13 is a representation of the wafer of FIG. 12 with a plurality of seal segments formed on it and divided into the plurality of seal segments.

Referring now to FIG. 13, once the processing steps are complete, the wafer 192 (FIG. 12) is divided up into individual seal segments 198. Each seal segment comprises a single piece and may be referred to as a chip (or a die). Dividing may entail one or more of selective etching, sawing, or scribing and breaking. Some additional processing steps may be desired. For example a processing step may be used to hermetically seal the seal segments. Seal segments fabricated in this manner have the physical shape and the electrical circuit described above with respect to FIGS. 3–6. This method of fabrication reduces the cost and the complexity of fabrication and results in reliable seal segments.

The conductors in the seal segments are of a type that can withstand the high temperature in the bearing compartment 50. Conductors for high temperature operation can be fabricated on silicon. One example of a conductor for high temperature operation is disclosed in a reference Jae Ryong Kim, Tong Yang Central laboratories, 38-1 Jung Ri, Kusung Myeon, Yongin Kun, Kyengki Do 449-910, Korea. The references discloses platinum films having a 111 orientation. The films have a thickness of 150 nanometers. The films pass adhesion tests and withstand temperatures of 1380° F. in an atmosphere of air.

There are various methods for affixing the magnet segments 134 of the annular magnet 132 to the seal plate 72. In one method, the magnet segments 134 are fabricated and then affixed to the seal plate 72. In another method, the magnet segments 134 are fabricated directly on seal plate 72. In the latter method, a mask is created on the seal plate 72. Creating the mask may involve several steps including:

forming a layer of photoresist, shining ultraviolet light onto the layer of photoresist through a photolithographic mask, removing exposed portions of the photoresist. The mask defines a plurality of footprints on the seal plate 72. Each footprint represents a location for one of the magnet segments 134. Vapor deposition is then used to form a magnet segment on each of the footprints. This method reduces the cost and the complexity of affixing the annular magnet 132 to the seal plate 72.

Figure 14:
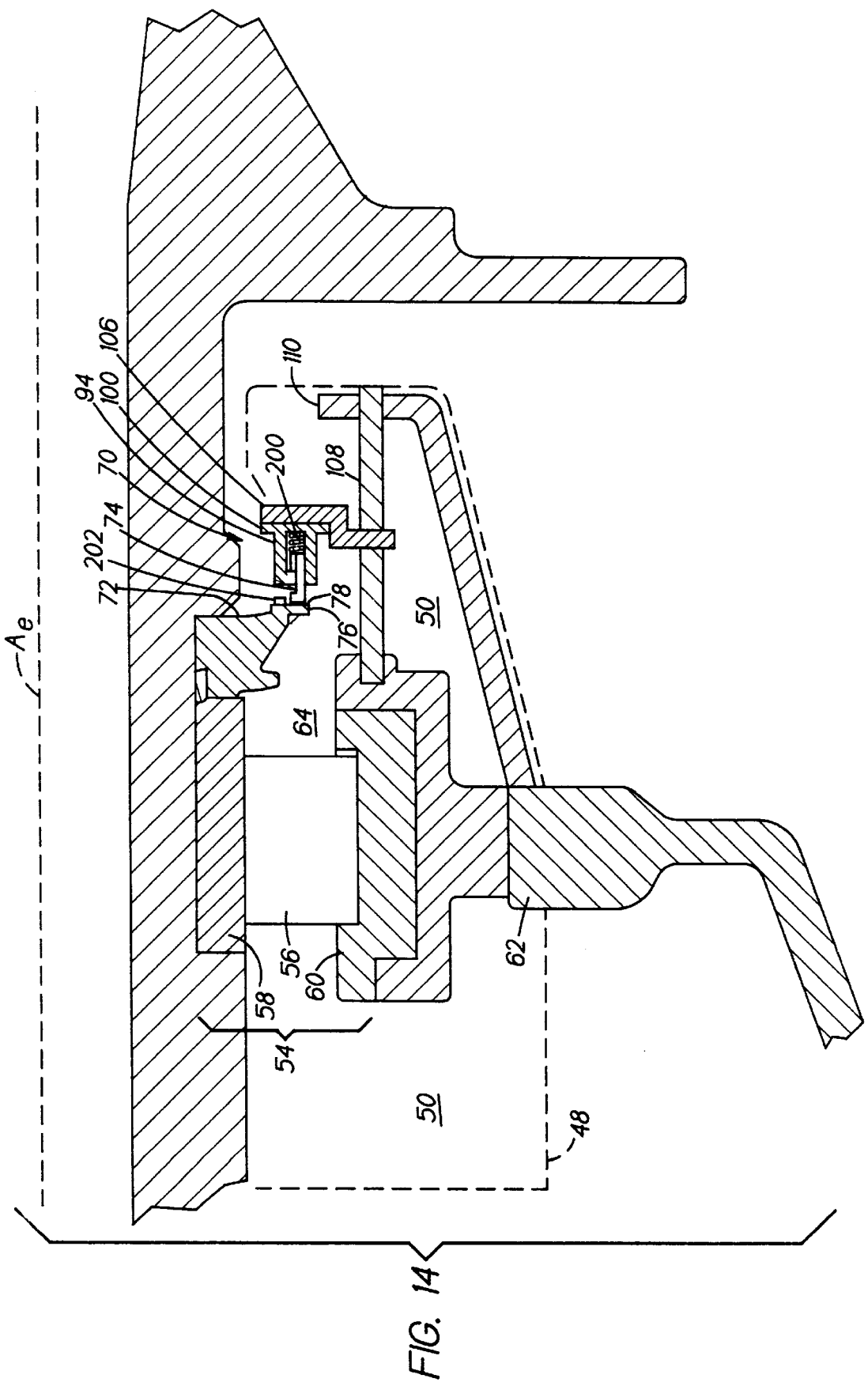
FIG. 14 is a cross section view of the bearing compartment defined in FIG. 1, having an alternative embodiment of the seal assembly.

FIG. 14 is a cross section view of the bearing compartment 50 defined in FIG. 1, showing an alternative embodiment of the seal assembly 70. FIG. 15 is an enlarge view of a portion of the view of FIG. 15. Referring now to FIGS. 14, 15, the alternative embodiment of the seal assembly 70 has an alternative biasing assembly comprising an array (or assembly) of springs, represented by a spring 200. The springs are disposed between the seal segments 80 and the base 100 of the seal carrier 94. The springs 200 provide forces that push the seal segments 80 toward the seal plate 72.

An annular magnet 202 is affixed to the sealing surface 78 side of the seal plate 72. At this location, the annular magnet does not produce a force that pulls the seal segments toward the seal plate 72. However, during operation of the engine 20, the annular magnet does provide a varying magnetic field that provides magnetic: energy to the generator.

As with the annular magnet 132 (FIGS. 2, 3, 6, 8) described above with respect to previous embodiments, the annular magnet 202 comprises a plurality of magnet segments each having a magnetic axis, represented by a magnet segment and an axis $A_m$, respectively. The magnetic axes of the magnet segments are parallel to each other, but unlike the annular magnet 132 adjacent magnet segments have like poles directed in opposite directions. With this orientation, the varying magnetic field produced by the annular magnet 202 is of greater amplitude and thereby provides a greater amount of energy to the generator, compared to that provided by the annular magnet 132 in the previous embodiments.

The seal assembly 70 further includes an alternative actuator comprising a piezoelectric element 206 affixed to the seal segment and an abutment 208 on the seal carrier. When provided with electrical energy (e.g., an electrical voltage) the piezoelectric element 206 stretches in a direction parallel to the longitudinal axis $A_e$. This results in a force in a direction $D_2$ that causes the seal segment to move in a direction away from the seal plate 72. This force is analogous to the force provided by the actuator (i.e., electromagnet and annular magnet) of the previous embodiment. Without electrical energy, the piezoelectric element returns to its original length wherein the springs force the seal segment to move in a direction $D_1$ toward the seal plate 72. In this embodiment, the abutment 208 is provided by a lip 210, i.e., a projection. However, in other embodiments, the abutment 208 may be provided within a recess 72.

Although disclosed with respect to embodiments for use in a seal assembly for a bearing compartment, the active seal element of the present invention may be employed in various sealing applications including but not limited to applications typically reserved for a labyrinth seal and applications involving sealing between the engine 20 case and the tips of rotating blades. For example in regard to a seal for a turbine rim cavity, it is expected that an active seal element without a controller could effect a 50% reduction in the purge airflow compared to that of a labyrinth seal. Thus, the purge air flow would represent only a ¼ percent of the airflow of the engine 20 and result in only a ¼ percent reduction in the efficiency of the engine 20 rather than a ½ percent of the airflow of the engine 20 and a ½ percent reduction in the efficiency of the engine 20. It is expected that an active seal element with a controller could achieve further reduction in the purge air flow.

Note that generation of electric energy is simplified by use of a magnet that provides a magnetic field and at least one coil that converts magnetic energy to electrical energy.

The rectifier is not limited to diode types. In one alternative embodiment, the rectifier comprises a relay, for example a relay having a pair of contacts, a coil and magnetic component fabricated using a MEMS fabrication process. The magnetic component of the relay is affixed to one of the relay contacts via a lever arm. The varying voltage from the generator is input to the relay coil and to one of the relay contacts. When the voltage from the generator is positive, the relay coil produces a magnetic field that causes the magnetic component to move in a direction that closes the relay contacts to conduct the positive voltage from the generator. When the voltage from the generator is negative, the relay coil produces a magnetic field that causes the magnetic component to move in a direction that opens the relay contact to prevent conduction of the negative voltage from the generator.

There are many different types of actuators. The actuator may be of any suitable type including but not limited to a type that produces electrostatic forces and a piezoelectric type. The actuator may reside entirely on the seal segment in whole, in part, or not at all. However, providing at least a part of the actuator on the seal segment facilitates efficient energy transfer to the actuator.

The controller is not limited to a hardwired configuration in integrated circuit form. Rather, the controller may be of any suitable type. For example, in some embodiments the controller comprises a programmed hardware configuration (i.e., a processor or computer executing a software program), hardwired hardware in non integrated circuit form, firmware, and combinations thereof. A program may be stored inside or outside of the controller. Furthermore, the controller may be an analog type with continuous signals, a digital type with periodically sampled signals, or a combination thereof. The controller may be centralized or decentralized (i.e., distributed throughout the electronics of the seal segments). Furthermore, the controller may comprise additional components and/or features. Or, the controller may comprise less than all the components described above.

Although the above embodiment discloses the sensor as a capacitive type proximity sensor, the sensor is not limited to such. The sensor may comprise any type that provides a suitable indication of the gap. In one alternative embodiment, the sensor comprises an inductive type of proximity sensor.

As described above, the generator, the controller, and the actuator are in communication. As used herein, communication means direct communication as shown, or alternatively, indirect communication. Thus, the communication path may comprise additional components between the generator, the controller, and the actuator. The seal assembly is disclosed with respect to an embodiment that uses generates and communicates electrical energy. Generating and communicating electrical energy helps to make the active seal element efficient. However, the seal assembly may generate and communicate energy of any type. Furthermore, the communication may include one or more conversions of energy from one type of energy to another type of energy. All that is required is that the generator produce energy and the actuator receive energy at least a portion of the energy. The received energy may be of the same type produced by the generator or of a type different than that produced by the generator. Accordingly, to receive (receiving) energy is defined herein as to receive (receiving) energy representing at least a portion of the converted energy wherein the received energy is of a type selected from a group comprising the type produced by the generator and a type different than that produced by the generator.

Although the present invention has been disclosed with respect to an embodiment having a biasing assembly that forces the seal segment toward the seal plate and having an actuator that forces the seal segment away from the seal plate, the present invention is not limited to such. For example, in an alternative embodiment, the biasing assembly forces the seal segment away from the seal plate and the actuator forces the seal segment toward the seal plate. In another embodiment, fluid and/or air provide biasing. In another embodiment, the actuator provides bi-directional forces and no biasing assembly is needed. In some embodiments, a biasing assembly is not required. For example, the controller and the actuator may be bi-directional.

In alternative embodiments, the seal assembly further includes an energy storage component. Energy produced by the generator but not required by the actuator is provided to the energy storage component. During periods when the generator does not receive external energy, the energy storage component returns the energy. The energy storage component may for example be a capacitor located on or external to the seal segment.

The seal segments can have a wide range of sizes. A suitable size for a seal segment depends on the handling requirements for the seal segment and the geometric characteristics of the seal element, including its size and shape, e.g., whether it is annular or linear. A seal segment manufactured using MEMS technology may have a size at least as small as 0.1 millimeters, and possibly smaller. Generally speaking for an active seal element, the smaller the diameter of the active seal element, the smaller the size of the seal segments.

Appropriate gaps will depend on the application. For example, if the seal assembly is replacing a labyrinth seal, some amount of constant leakage may be desired. On the other hand, a seal assembly in a bearing compartment may seek to minimize any amounts of leakage.

The seal segments need not be of a MEMS type. For example, the seal segment may be constructed from separate pieces. The generator and the actuator element may comprise an integrated circuit and/or discrete components affixed to the seal segment. Windings if used may comprise insulated strands of wires.

The active seal element may be used in any type of application including but not limited to any gas turbine engine application.

Although the present invention has been described with reference to a best mode embodiment, this description is not meant to be construed in a limiting sense. Various modifications of the best mode embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. A seal assembly comprising:
   a seal member having a sealing surface;
   a magnet;
   a seal element having a plurality of seal segments each having a sealing surface that faces the sealing surface of the seal member, each of the seal segments further having at least one coil;
   a plurality of actuators, each one of the actuators being associated with a respective one of the plurality of seal segments, and each of the plurality of actuators having at least a portion integral to the associated one of the plurality of seal segments;
   wherein at least one of the seal element and the magnet rotates relative to the other such that the coils on each of the plurality of seal segments generate electrical energy, and each of the plurality of actuators receives energy generated by the coil of the associated one of the plurality of seal segments and in response thereto, produces a force to move the associated one of the plurality of seal segments in at least one direction from a group comprising a direction toward the sealing surface of the seal member and a direction away from the sealing surface of the seal member.

2. The seal assembly of claim 1 wherein the plurality of seal segments are adjacent to one another.

3. The seal assembly of claim 1 wherein the seal element is annular and has an axis and the plurality of seal segments are circumferentially adjacent to one another.

4. The seal assembly of claim 3 wherein the each of the seal segments are movable in a direction parallel to the axis.

5. The seal assembly of claim 1 wherein each of the plurality of seal segments further have a proximity sensor and a controller, the proximity sensor providing a signal indicative of a measure of the gap, the controller receiving the signal from the proximity sensor and generating, in response, a signal indicative of an amount of energy to be provided to the actuator.

6. The seal assembly of claim 5 wherein the proximity sensor comprises at least one metal plate.

7. The seal assembly of claim 1 further comprising a biasing assembly that provides a force directed to move the plurality of seal segments in at least one direction from a group comprising a direction toward the seal member and a direction away from the seal member.

8. The seal assembly of claim 7 wherein the biasing assembly comprises a spring assembly.

9. The seal assembly of claim 1 further comprising a biasing assembly that provides a force directed to move the plurality of seal segments in at least one direction from a group comprising a direction toward the seal member and a direction away from the seal member, the biasing assembly comprising a member on each of the seal segments, the member comprising a material attracted to a magnetic field.

10. The seal assembly of claim 1 wherein each of the actuators comprises an electromagnet.

11. The seal assembly of claim 10 wherein the electromagnet of each actuator is integral to the associated one of the plurality of seal segments.

12. The seal assembly of claim 1 wherein each of the actuators comprises a piezoelectric element.

13. The seal assembly of claim 12 wherein the piezoelectric element of each actuator is integral to the associated one of the plurality of seal segments.

14. The seal assembly of claim 1 wherein the seal element is annular and has an axis and the plurality of seal segments are circumferentially adjacent to one another, each of the plurality of seal segments are movable in a direction parallel to the axis, each of the plurality of seal segments further have a proximity sensor and a controller, the proximity sensor providing a signal indicative of a measure of the gap, the controller receiving the signal from the proximity sensor and generating, in response, a signal indicative of an amount of electrical energy to be provided to the actuator; and the seal assembly further comprises:

a biasing assembly that provides a force directed to move each of the plurality of seal segment in at least one direction from a group comprising a direction toward the seal member and a direction away from the seal member.

15. The seal assembly of claim 1 wherein each of the plurality of seal segments has a track having a shape from a group of a recess and a projection, the track having a length extending in a direction substantially parallel to the axis, and the seal assembly further comprises:

a carrier comprising an inner ring and an outer ring, the inner and the outer rings being concentric and separated to define a channel that receives the plurality of seal segments, at least one of the inner and the outer concentric rings having a plurality of locators, each of the plurality of locators having a shape from a group of a recess and a projection, each of the locators extending in a direction substantially parallel to the axis.

* * * * *